(12) United States Patent
Stout

(10) Patent No.: US 6,826,691 B1
(45) Date of Patent: Nov. 30, 2004

(54) ARRANGEMENT FOR ENCRYPTION/DECRYPTION OF DATA AND DATA CARRIER INCORPORATING SAME

(75) Inventor: Graham Henry Stout, Giffnock (GB)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/308,604

(22) PCT Filed: Oct. 20, 1997

(86) PCT No.: PCT/EP97/05916

§ 371 (c)(1),
(2), (4) Date: Nov. 15, 1999

(87) PCT Pub. No.: WO98/22878

PCT Pub. Date: May 28, 1998

(30) Foreign Application Priority Data

Nov. 21, 1996 (GB) ................................. 964187

(51) Int. Cl.[7] .............................................. G06F 12/14
(52) U.S. Cl. ....................... 713/193; 713/190; 713/200; 380/29; 380/37
(58) Field of Search ............................... 713/193, 200, 713/190; 380/37, 29

(56) References Cited

U.S. PATENT DOCUMENTS

| | | | | |
|---|---|---|---|---|
| 4,275,265 A | * | 6/1981 | Davida et al. ........... | 178/22.09 |
| 4,434,323 A | * | 2/1984 | Levine et al. ............... | 380/260 |
| 4,543,646 A | * | 9/1985 | Ambrosius et al. ........... | 380/29 |
| 4,751,733 A | * | 6/1988 | Delayaye et al. ............. | 380/42 |
| 5,001,753 A | * | 3/1991 | Davio et al. .................. | 380/29 |
| 5,168,521 A | * | 12/1992 | Delaporte et al. ............ | 380/29 |
| 5,530,962 A | * | 6/1996 | Ramey ....................... | 700/249 |
| 5,559,992 A | * | 9/1996 | Stutz et al. .................. | 711/163 |
| 5,694,567 A | * | 12/1997 | Bourekas et al. ............. | 711/3 |
| 5,918,229 A | * | 6/1999 | Davis et al. .................. | 707/10 |
| 5,991,847 A | * | 11/1999 | Ballard et al. ................. | 711/3 |

FOREIGN PATENT DOCUMENTS

| | | | | |
|---|---|---|---|---|
| EP | 0837475 A2 | * | 4/1998 | ........... G11C/11/22 |
| GB | 2228560 A1 | * | 8/1990 | ............. H04L/9/06 |
| GB | 2376775 A1 | * | 12/2002 | ............. G06F/1/00 |

OTHER PUBLICATIONS

Dunne, Greg, Telequip Corp. Introduces the Crypta Plus Card, 1995, PR Newswire, pp. 1–3.*
McKee et al, A Memory Controller for Improved Performance of Streamed Computations on Symmetric Multiprocessors, 1996, IEEE, pp. 159–165.*
Bursky, Dave, Flash and EEPROM technologies combine on feature–rich MCUs, 1997, Electronic Design, pp. 81, 82, 84, 86, 88, 90, 92, 94.*
Kuhn, Markus, Cipher Instruction Search Attack on the Bus–Encryption Security Microcontroller DS5002FP, 1998, IEEE, pp. 1153–1157.*
Samyde et al, On a New Way to REad Data from Memory, 2003, IEEE, pp. 65–69.*

* cited by examiner

Primary Examiner—Ayaz Sheikh
Assistant Examiner—Aravind Moorthy

(57) ABSTRACT

An arrangement (6) for encrypting/decrypting data includes a random access memory (12) for holding the data and a processor (10) for processing the data. The processor includes a memory map including a first portion (12.0) mapped onto the random access memory and a second portion (12.1). The processor further includes control means (18, 34, 26) coupled to receive all instruction to write data to an address in the second portion of the memory map and in response thereto to write the data in a predetermined permuted form to an associated address in the random access memory. The data read from said associated address in the random access memory is an encrypted/decrypted version of the data written to said address in the second portion of the memory map.

14 Claims, 3 Drawing Sheets

US 6,826,691 B1

ARRANGEMENT FOR ENCRYPTION/DECRYPTION OF DATA AND DATA CARRIER INCORPORATING SAME

FIELD OF THE INVENTION

This invention relates generally to encryption/decryption of data, and to data carriers incorporating arrangements for encryption/decryption of data.

BACKGROUND OF THE INVENTION

Electronic devices are commonly used to carry data (such as, for example, financial or personal data) which must be kept secure from unauthorised access. A typical method of preventing unauthorised access to data carried in such devices is by the use of a password.

A typical, known password scheme involves the use of the known Data Encryption Standard (DES) to encrypt/decrypt the password. In its steps the Data Encryption Standard algorithm requires data to be permuted in a predetermined manner.

The practical implementation of the Data Encryption Standard typically requires the presence of extra registers and/or additional processing steps to effect the required permutations.

SUMMARY OF THE INVENTION

It is an object of the present invention to provide an arrangement for encryption/decryption of data, and a data carrier incorporating same, in which the above disadvantages are overcome or at least alleviated.

In accordance with a first aspect of the invention there is provided an arrangement for encryption/decryption of data as claimed in claim 1.

In accordance with a second aspect of the invention there is provided an arrangement for encryption/decryption of data as claimed in claim 2.

In accordance with a third aspect of the invention there is provided a data carrier incorporating an arrangement for encryption/decryption of data as claimed in claim 6.

BRIEF DESCRIPTION OF THE DRAWINGS

One data carrier incorporating an arrangement for encryption/decryption of data will now be described, by way of example only, with reference to the accompanying drawings, in which.

DETAILED DESCRIPTION OF A PREFERRED EMBODIMENT

Figure 1:
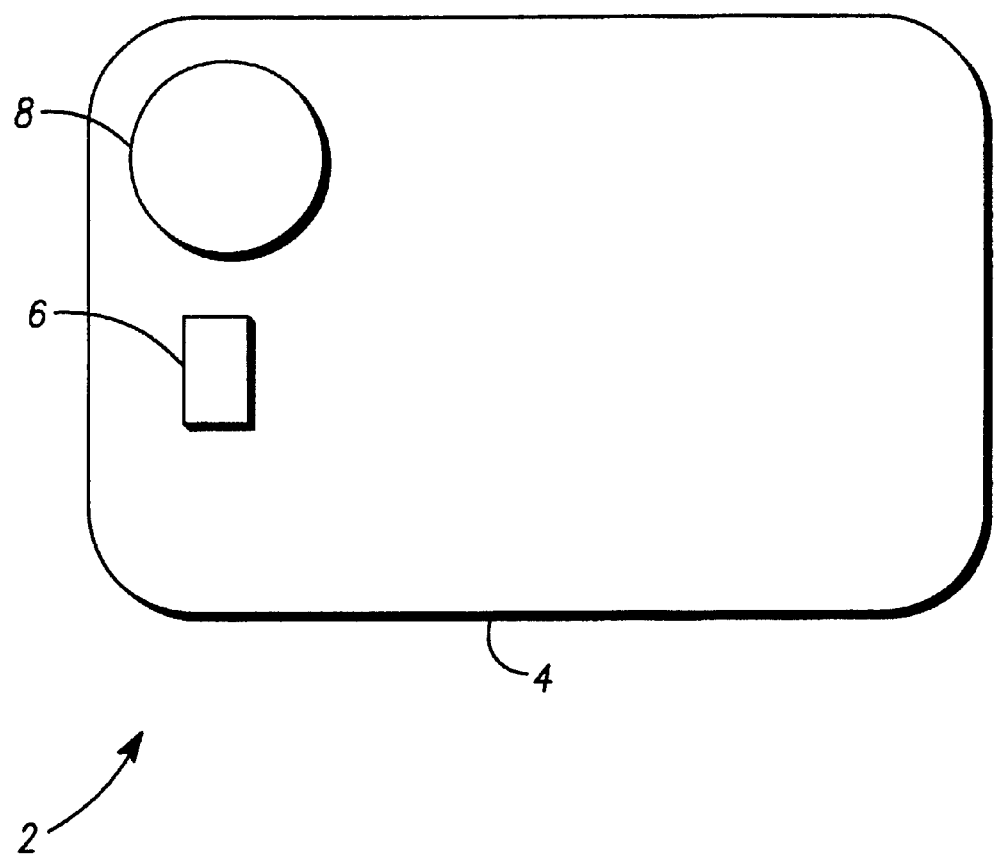
FIG. 1 shows a data carrier utilising the present invention.

Referring firstly to FIG. 1, a smart card data carrier 4, is formed of a conventionally-sized plastic card 4, which encapsulates an integrated circuit microcontroller 6. Contacts 8 provide an interface between the card's microcontroller 6 and a card reader (not shown).

Figure 2:
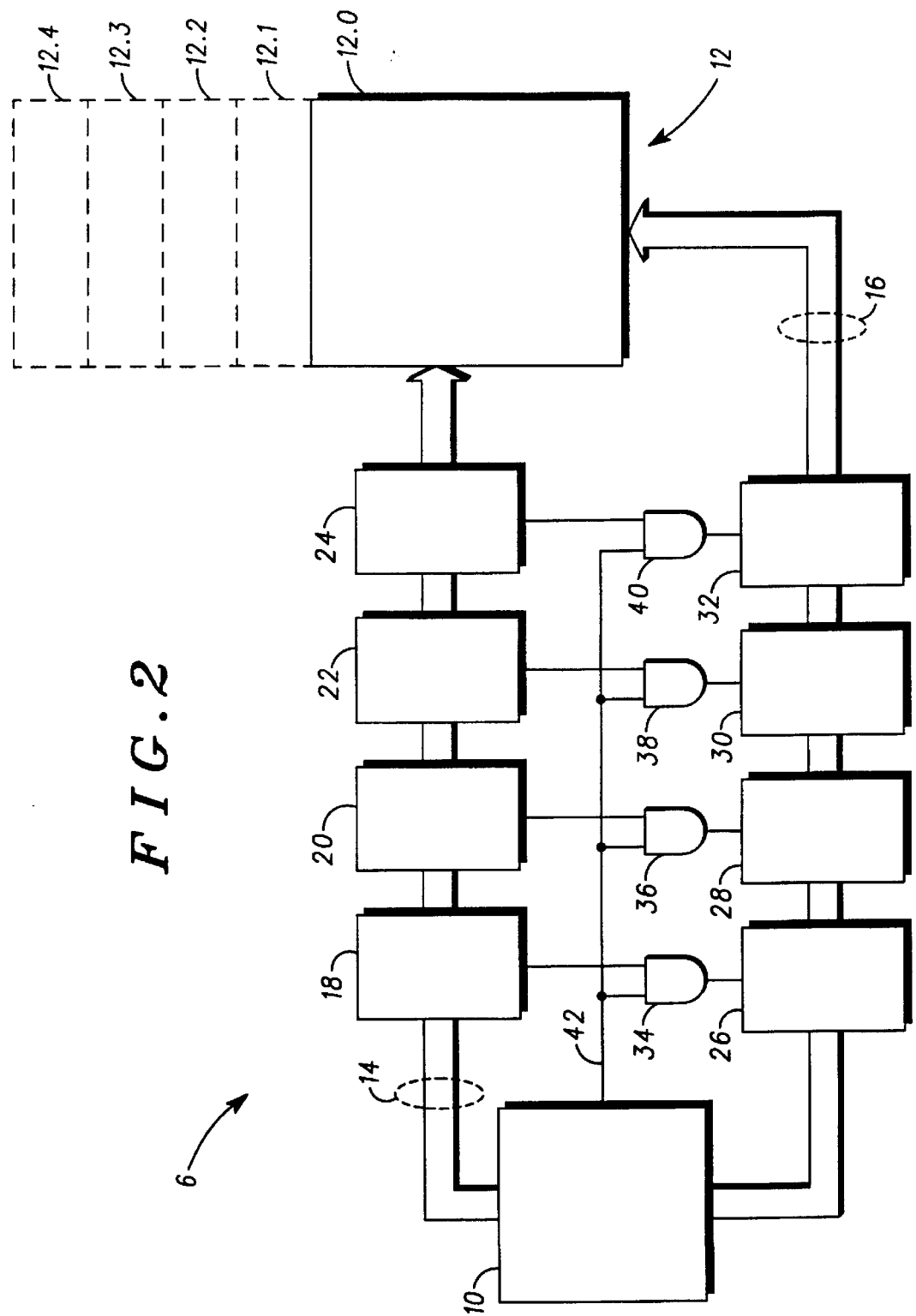
FIG. 2 shows a block schematic diagram of a microcontroller of the data carrier of FIG. 1.

Referring now also to FIG. 2, the microcontroller 6 comprises a central processing unit (CPU) 10 which is coupled to random access memory (RAM) 12 via an address bus 14 and a data bus 16. As will be described in more detail below, the address space of the CPU 10 is mapped on to five memory ranges 12.0 ($10 to $FF), 12.1 ($110 to $1FF), 12.2 ($210 to $2FF), 12.3 ($310 to $3FF) and 12.4 ($410 to $4FF). Only the lowest address range 12.0 ($10 to $FF) contains physical RAM.

Four similar address range detectors 18, 20, 22 and 24 are coupled to the address bus 14. As will be described in more detail below, the address range detectors 18, 20, 22 and 24 detect whether an address on the address bus is within one of four respective chosen ranges, and to produce a corresponding detector output.

Four similar logic circuits 26, 28, 30 and 32 (which will be described in more detail below) are connected in the data bus 16. Four logic AND gates 34, 36, 38 and 40 have their outputs connected respectively to the logic circuits 26, 28, 30 and 32. The AND gates 34, 36, 38 and 40 each have one input connected to the output of a respective address range detectors 18, 20, 22 and 24. The AND gates 34, 36, 38 and 40 each have another input connected to receive a write enable signal from the CPU 10 on line 42.

As will be described below, the circuitry of FIG. 2 is particularly useful in performing the Data Encryption Standard (DES) algorithm. As referenced above, the DES algorithm is a well-known algorithm for encryption/decryption of data such as passwords and cipher keys. Further details of the DES algorithm are given in National Bureau of Standards Publication 500-20, 1980 "Validating the Correctness of Hardware Implementations of the NBS Data Encryption Standard", which is hereby incorporated by reference.

As well known, the DES algorithm requires data to be permuted in two different pre-defined permutations: a 32-bit permutation conventionally termed the "p" permutation, and a 48-bit permutation conventionally termed the "permuted choice 2" permutation.

As will be described below, in the microcontroller 6 the "p" permutation and the "permuted choice 2" permutation are performed in hardware, other steps of the DES algorithm being performed in software (as is well known) and requiring no further explanation.

The "p" permutation is performed by combining two sub-functions P1 and P2, and the "permuted choice 2" permutation is performed by combining two sub-functions KS1 and KS2.

The P1 sub-function is defined as follows:

|  | 7 | 6 | 5 | 4 | 3 | 2 | 1 | 0 |
|---|---|---|---|---|---|---|---|---|
| p1 input byte 0 | 01 | 02 | 03 | 04 | — | — | — | — |
| p1 input byte 1 | 09 | 10 | 11 | 12 | — | — | — | — |
| p1 input byte 2 | 17 | 18 | 19 | 20 | — | — | — | — |
| p1 input byte 3 | 25 | 26 | 27 | 23 | — | — | — | — |
| p1 output byte 0 | — | — | 20 | — | — | 12 | 28 | 17 |
| p1 output byte 1 | 01 | — | — | 26 | — | 18 | — | 10 |
| p1 output byte 2 | 02 | — | — | — | — | 27 | 03 | 09 |
| p1 output byte 3 | 19 | — | — | — | — | 11 | 04 | 25 |

The P2 sub-function is defined as follows:

|  | 7 | 6 | 5 | 4 | 3 | 2 | 1 | 0 |
|---|---|---|---|---|---|---|---|---|
| p2 input byte 0 | — | — | — | — | 05 | 06 | 07 | 08 |
| p2 input byte 1 | — | — | — | — | 13 | 14 | 15 | 16 |

-continued

|  | 7 | 6 | 5 | 4 | 3 | 2 | 1 | 0 |
|---|---|---|---|---|---|---|---|---|
| p2 input byte 2 | — | — | — | — | 21 | 22 | 23 | 24 |
| p2 input byte 3 | — | — | — | — | 29 | 30 | 31 | 32 |
| p2 output byte 0 | 16 | 07 | — | 21 | 29 | — | — | — |
| p2 output byte 1 | — | 15 | 23 | — | 5 | — | 31 | — |
| p2 output byte 2 | — | 08 | 24 | 14 | 32 | — | — | — |
| p2 output byte 3 | — | 13 | 30 | 06 | 22 | — | — | — |

The KS1 sub-function is defined as follows:

|  | 7 | 6 | 5 | 4 | 3 | 2 | 1 | 0 |
|---|---|---|---|---|---|---|---|---|
| KS1 input byte 0 | 01 | 02 | 03 | 04 | 05 | 06 | 07 | 08 |
| KS1 input byte 1 | 09 | 10 | 11 | 12 | 13 | 14 | 15 | 16 |
| KS1 input byte 2 | 17 | 18 | 19 | 20 | 21 | 22 | 23 | 24 |
| KS1 input byte 3 | 25 | 26 | 27 | 28 | — | — | — | — |
| KS1 output byte 0 | — | — | 14 | 17 | 11 | 24 | 01 | 05 |
| KS1 output byte 1 | — | — | 03 | 28 | 15 | 06 | 21 | 10 |
| KS1 output byte 2 | — | — | 23 | 19 | 12 | 04 | 26 | 08 |
| KS1 output byte 3 | — | — | 16 | 07 | 27 | 20 | 13 | 02 |

The KS2 sub-function is defined as follows:

|  | 7 | 6 | 5 | 4 | 3 | 2 | 1 | 0 |
|---|---|---|---|---|---|---|---|---|
| KS2 input byte 0 | 29 | 30 | 31 | 32 | 33 | 34 | 35 | 36 |
| KS2 input byte 1 | 37 | 38 | 39 | 40 | 41 | 42 | 43 | 44 |
| KS2 input byte 2 | 45 | 46 | 47 | 48 | 49 | 50 | 51 | 52 |
| KS2 input byte 3 | 53 | 54 | 55 | 56 | — | — | — | — |
| KS2 output byte 0 | — | — | 41 | 52 | 31 | 37 | 47 | 48 |
| KS2 output byte 1 | — | — | 44 | 49 | 39 | 56 | 34 | 53 |
| KS2 output byte 2 | — | — | 46 | 42 | 50 | 36 | 29 | 32 |
| KS2 output byte 3 | — | — | 46 | 42 | 50 | 36 | 29 | 32 |

In the above table definitions of the P1 and P2 sub-functions and the KS1 and KS2 sub-functions, the bit numbering scheme is as described in the above-quoted NBS reference.

It may also be noted that bits 9, 18, 22, 25, 35, 38, 43 and 54 in the KS1 and KS2 sub-functions are unused, as also described in the above-quoted NBS reference.

In order to perform the P1 sub-function, the CPU attempts to write four bytes (0 to 3) of source data (to be permuted) to address locations in the memory address space 12.1 ($110 to $1FF). The effect of this is actually to write permuted data into corresponding memory locations in the address range 12.0 ($10 to $FF). This permutation is achieved as follows.

When the address range detector 18 detects that the address bus carries an address in this range ($1xx), it produces its output to the AND gate 34. The AND gate 34 also receives a write enable signal from the CPU 10, and produces a permute enable signal to the logic circuit 26.

Absent a permute enable signal, the logic circuit 26 passes data along the data bus directly without permuting its bits. However, in the presence of a permute enable signal produced by its associated AND gate, the logic circuit 26 permutes the individual bits of data on the data bus in accordance with the definition given in the upper half of the P1 table above. The permuted data is then written to the physical memory locations at corresponding addresses in the range ($10 to $FF), the most significant character of the attempted address (in the range $110 to $1FF) being ignored in actually writing the data into physical RAM memory space 12.0.

The result of this permuted writing is that after all four bytes have been written by the CPU, the permuted data can be read from the physical memory space 12.0 ($10 to $FF) as shown the lower half of the P1 table above.

Similarly, to the process described above for the P1 sub-function, in order to perform the P2 sub-function, the CPU attempts to write four bytes (0 to 3) of source data (to be permuted) to address locations in the memory address space 12.2 ($210 to $2FF). The effect of this is actually to write permuted data into corresponding memory locations in the address range 12.0 ($10 to $FF). This permutation is achieved as follows.

When the address range detector 20 detects that the address bus carries an address in this range ($2xx), it produces its output to the AND gate 36. The AND gate 36 also receives a write enable signal from the CPU 10, and produces a permute enable signal to the logic circuit 28.

Absent a permute enable signal, the logic circuit 28 passes data along the data bus directly without permuting its bits. However, in the presence of a permute enable signal produced by its associated AND gate, the logic circuit 28 permutes the individual bits of data on the data bus in accordance with the definition given in the upper half of the P2 table above. The permuted data is then written to the physical memory locations at corresponding addresses in the range ($10 to $FF), the most significant character of the attempted address (in the range $210 to $2FF) being ignored in actually writing the data into physical RAM memory space 12.0.

The result of this permuted writing is that after all four bytes have been written by the CPU, the permuted data can be read from the physical memory space 12.0 ($10 to $FF) as shown the lower half of the P2 table above.

It will be understood that by performing the P1 sub-function followed by the P2 sub-function, the "p" permutation is achieved, and the "p" permuted data can be read directly from the four corresponding bytes in the physical memory space 12.0 ($10 to $FF).

It will be understood that the P1 sub-function uses only the upper four bits of each input byte, while the P2 sub-function uses only the lower four bits of each input byte, the unused four bits being discarded in each case. This allows efficient coding of the DES algorithm in the microcontroller 6: since the previous step in the DES algorithm is the "s1 . . . s8 switch box lookup table", which returns two switch boxes per byte, the programmer is not required to mask out the extra four bits (saving code and time) before performing the "p" permutation as described above.

Similarly, to the process described above for the P1 and P2 sub-functions, in order to perform the KS1 sub-function, the CPU attempts to write four bytes (0 to 3) of source data (to be permuted) to address locations in the memory address space 12.3 ($310 to $3FF). The effect of this is actually to write permuted data into corresponding memory locations in the address range 12.0 ($10 to $FF). This permutation is achieved as follows.

When the address range detector 22 detects that the address bus carries an address in this range ($3xx), it produces its output to the AND gate 38. The AND gate 38 also receives a write enable signal from the CPU 10, and produces a permute enable signal to the logic circuit 30.

Absent a permute enable signal, the logic circuit 30 passes data along the data bus directly without permuting its bits. However, in the presence of a permute enable signal produced by its associated AND gate, the logic circuit 30 permutes the individual bits of data on the data bus in accordance with the definition given in the upper half of the KS1 table above. The permuted data is then written to the physical memory locations at corresponding addresses in the range ($10 to $FF), the most significant character of the attempted address (in the range $310 to $3FF) being ignored in actually writing the data into physical RAM memory space 12.0.

The result of this permuted writing is that after all four bytes have been written by the CPU, the permuted data can be read from the physical memory space 12.0 ($10 to $FF) as shown the lower half of the KS1 table above.

Similarly, to the process described above for the P1, P2 and KS1 sub-functions, in order to perform the KS2 sub-function, the CPU attempts to write four bytes (0 to 3) of source data (to be permuted) to address locations in the memory address space 12.4 ($410 to $4FF). The effect of this is actually to write permuted data into corresponding memory locations in the address range 12.0 ($10 to $FF). This permutation is achieved as follows.

When the address range detector 24 detects that the address bus carries an address in this range ($4xx), it produces its output to the AND gate 40. The AND gate 40 also receives a write enable signal from the CPU 10, and produces a permute enable signal to the logic circuit 32.

Absent a permute enable signal, the logic circuit 32 passes data along the data bus directly without permuting its bits. However, in the presence of a permute enable signal produced by its associated AND gate, the logic circuit 32 permutes the individual bits of data on the data bus in accordance with the definition given in the upper half of the KS2 table above. The permuted data is then written to the physical memory locations at corresponding addresses in the range ($10 to $FF), the most significant character of the attempted address (in the range $410 to $4FF) being ignored in actually writing the data into physical RAM memory space 12.0.

The result of this permuted writing is that after all four bytes have been written by the CPU, the permuted data can be read from the physical memory space 12.0 ($10 to $FF) as shown the lower half of the KS2 table above.

It will be understood that by performing the KS1 sub-function followed by the KS2 sub-function, the "permuted choice 2" permutation is achieved, and the "permuted choice 2" permuted data can be read directly from the four corresponding bytes in the physical memory space 12.0 ($10 to $FF).

It will be understood that the KS1 and KS2 sub-functions, into which the 48-bit "permuted choice 2" function is split, are 28-bit functions which are spread over four bytes with the most significant two bits of each byte unused (i.e., clear).

It will be understood that necessary interconnection of the logic circuitry in the logic circuits 26, 28, 30 and 32 will be readily apparent since it follows directly from the definitions given in the tables above for the sub-functions P1, P2, KS1 and KS2, and so needs no further explanation in this description.

It will be appreciated that by utilising the hardware permutation and "virtual memory" addressing techniques described above, advantages of speed and efficiency are obtained over the known technique of implementing the DES algorithm entirely in software. A comparison reveals the above-described "hardware" embodiment to be more than twice as fast as the known software-only technique, and to require some 40% less code than the known software-only technique (so requiring less ROM to hold the code).

It will be appreciated that the increased speed advantage of the above-described "hardware" embodiment can be "traded-off" for slower CPU operation (a slower clock speed producing lower power consumption) in power sensitive applications.

It will also be understood that the above-described "hardware" embodiment is "silicon area" efficient, since the extra area required for the additional circuitry necessary is substantially entirely offset by the saving in silicon area from reduced need for memory to hold code. Hence the above-described "hardware" embodiment produces its advantage at little or no cost in fabricating the integrated circuit microcontroller.

It will further be understood that, although in the above-described "hardware" embodiment data permutation is achieved by writing to a "virtual memory" space and reading the permuted data directly from physical memory, an analogous technique is possible in which data permutation is achieved by writing directly to physical memory and permuting the data in hardware when reading from a "virtual memory" space.

Figure 3:
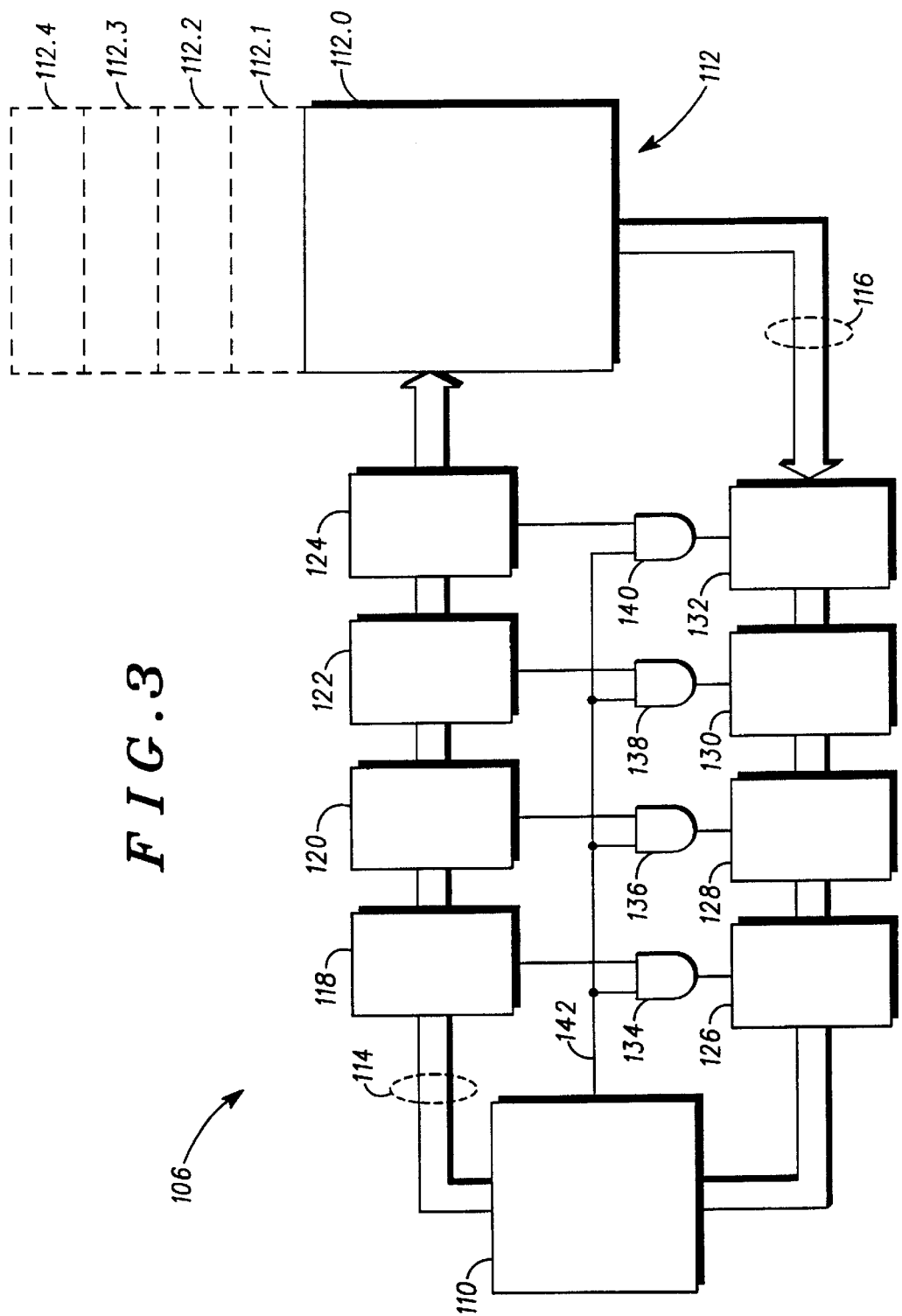
FIG. 3 shows a block schematic diagram of an alternative microcontroller which may be used in the data carrier of FIG. 1.

FIG. 3 shows an alternate microcontroller in which this analogous technique is used.

Referring now to FIG. 3, a microcontroller 106 comprises a central processing unit (CPU) 110 which is coupled to random access memory (RAM) 112 via an address bus 114 and a data bus 116. The address space of the CPU 110 is mapped on to five memory ranges 12.0 ($10 to $FF), 12.1 ($110 to $1FF), 12.2 ($210 to $2FF), 12.3 ($310 to $3FF) and 12.4 ($410 to $4FF). Only the lowest address range 12.0 ($10 to $FF) contains physical RAM.

Four similar address range detectors 118, 120, 122 and 124 are coupled to the address bus 114. The address range detectors 118, 120, 122 and 124 detect whether an address on the address bus is within one of four respective chosen ranges, and produce a corresponding detector output.

Four similar logic circuits 126, 128, 130 and 132 are connected in the data bus 116. Four logic AND gates 134, 136, 138 and 140 have their outputs connected respectively to the logic circuits 126, 128, 130 and 132. The AND gates 134, 136, 138 and 140 each have one input connected to the output of a respective address range detector 118, 120, 122 and 124. The AND gates 134, 136, 138 and 140 each have another input connected to receive a read enable signal from the CPU 110 on line 142.

It will be understood that the microcontroller 106 achieves hardware data permutation in implementing the DES algorithm in a manner analogous to that described above for the microcontroller 6 shown in FIG. 2. However, whereas in the microcontroller 6 data permutation is achieved by writing data to a virtual memory address (and permuting the data in hardware when writing) then reading the permuted data directly from physical memory, the microcontroller 106 achieves data permutation by writing directly to physical memory then reading from a "virtual memory" space (and permuting the data in hardware when reading).

It will be appreciated that various other modifications will be apparent to a person of ordinary skill in the art.

What is claimed is:

1. An arrangement for encrypting/decrypting data comprising:

random access memory means for holding the data;

a processor for processing the data, the processor having a memory map including a first portion mapped onto the random access memory and a second portion; and control means coupled to receive an instruction to write data to an address in the second portion of the memory map and in response thereto to write the data in a predetermined permuted form to an associated address in the random access memory, whereby data read form said associated address in the random access memory is an encrypted/decrypted version of the data written to said address in the second portion of the memory map, wherein the first portion corresponds to a first address range of a physical memory and the second portion corresponds to a second address range not corresponding to the physical memory and the memory map includes a third portion corresponding to a third address range not corresponding to the physical memory and wherein the control means are operable to receive an instruction to write data to an address in the third portion of the memory map and in response thereto to write the data in a different predetermined permuted form than the permutated form of the second portion to an associated address in the random access memory, whereby data read from said associated address in the random access memory is an encrypted/decrypted version of the data written to said address in the third portion of the memory map.

2. An arrangement for encrypting/decrypting data according to claim 1 wherein the data encryption/decryption is a permutation function in the DES algorithm.

3. An arrangement for encrypting/decrypting data according to claim 2 wherein the DES permutation function is achieved by performing sequential sub-functions.

4. An arrangement for encrypting/decrypting data according to claim 2 wherein the DES permutation function is the "p" permutation and the subfunctions are arranged to leave unused the most significant bits and least significant bits respectively of data to be permuted.

5. A data carrier incorporating an arrangement for encrypting/decrypting data as claimed in claim 1.

6. An arrangement for encrypting/decrypting data according to claim 1 wherein the memory map maps an address space of the processor to a plurality of address ranges.

7. An arrangement for encrypting/decrypting data according to claim 1 wherein the control means comprises a plurality of logic circuits operable to differently permute the data and an address range detector operable to activate one of the plurality of logic circuits in response to the address.

8. An arrangement for encrypting/decrypting data comprising:

random access memory means for holding the data;

a processor for processing the data, the processor having a memory map including a first portion mapped onto the random access memory and a second portion; and control means coupled to receive an instruction to read data from an address in the second portion of the memory map and in response thereto to read in a predetermined permuted form data from an associated address in the random access memory, whereby said data read in response to said instruction to read data from an address in the second portion of the memory map is ant encrypted/decrypted version of data written to said associated address in the random access memory, wherein the first portion corresponds to a first address range of a physical memory and the second portion corresponds to a second address range not corresponding to the physical memory and the memory map includes a third portion corresponding to a third address range not corresponding to the physical memory and wherein the control means are operable to receive an instruction to read data from an address in the third portion of the memory map and in response thereto to read in a different predetermined permuted form than the permutated form of the second portion data from an associated address in the random access memory, whereby said data read in response to said instruction to read data from an address in the third portion of the memory map is an encrypted/decrypted version of data written to said associated address in the random access memory.

9. An arrangement for encrypting/decrypting data according to claim 8 wherein the control means comprises a plurality of logic circuits operable to differently permute the data and an address range detector operable to activate one of the plurality of logic circuits in response to the address.

10. An arrangement for encrypting/decrypting data according to claim 8 wherein the memory map maps an address space of the processor to a plurality of address ranges.

11. A data carrier incorporating an arrangement for encrypting/decrypting data as claimed in claim 8.

12. An arrangement for encrypting/decrypting data according to claim 8 wherein the data encryption/decryption is a permutation function in the DES algorithm.

13. An arrangement for encrypting/decrypting data according to claim 12 wherein the DES permutation function is achieved by performing sequential sub-functions.

14. An arrangement for encrypting/decrypting data according to claim 12 wherein the DES permutation function is the "p" permutation and the sub-functions are arranged to leave unused the most significant bits and least significant bits respectively of data to be permuted.

* * * * *